(12) United States Patent
Wu et al.

(10) Patent No.: US 11,901,652 B2
(45) Date of Patent: Feb. 13, 2024

(54) ANTENNA WITH MULTIPLE FREQUENCY RANGES AND ELECTRONIC DEVICE

(71) Applicants: Futaijing Precision Electronics (Yantai) Co., Ltd., Yantai (CN); HON HAI PRECISION INDUSTRY CO., LTD., New Taipei (TW)

(72) Inventors: Ching-Ling Wu, New Taipei (TW); Hsiang-Neng Wen, New Taipei (TW); Jia-Hung Hsiao, New Taipei (TW); Chih-Wei Liao, New Taipei (TW); Yung-Yu Tai, New Taipei (TW)

(73) Assignees: Futaijing Precision Electronics (Yantai) Co., Ltd., Yantai (CN); HON HAI PRECISION INDUSTRY CO., LTD., New Taipei (TW)

(*) Notice: Subject to any disclaimer, the term of this patent is extended or adjusted under 35 U.S.C. 154(b) by 92 days.

(21) Appl. No.: 17/708,172

(22) Filed: Mar. 30, 2022

(65) Prior Publication Data

US 2023/0275353 A1  Aug. 31, 2023

(30) Foreign Application Priority Data

Feb. 25, 2022  (CN) .......................... 202210179676.6

(51) Int. Cl.
*H01Q 1/52* (2006.01)
*H01Q 9/42* (2006.01)
*H01Q 5/45* (2015.01)

(52) U.S. Cl.
CPC ............... *H01Q 9/42* (2013.01); *H01Q 1/521* (2013.01); *H01Q 5/45* (2015.01)

(58) Field of Classification Search
CPC .......... H01Q 1/52; H01Q 1/521; H01Q 1/523; H01Q 5/40; H01Q 5/42; H01Q 5/45; H01Q 5/47; H01Q 5/48; H01Q 5/49
See application file for complete search history.

(56) References Cited

U.S. PATENT DOCUMENTS

| | | | |
|---|---|---|---|
| 10,347,977 B1* | 7/2019 | Kim ......................... | H01Q 9/30 |
| 2013/0099980 A1 | 4/2013 | Hayashi | |
| 2017/0271759 A1* | 9/2017 | Liu ........................... | H01Q 9/42 |
| 2021/0151887 A1* | 5/2021 | Wang ..................... | H01Q 1/521 |

FOREIGN PATENT DOCUMENTS

| | | |
|---|---|---|
| CN | 106058491 A | 10/2016 |
| CN | 107706529 A | 2/2018 |
| TW | 201635643 A | 10/2016 |

* cited by examiner

*Primary Examiner* — Daniel Munoz
(74) *Attorney, Agent, or Firm* — ScienBiziP, P.C.

(57) ABSTRACT

An antenna with multi frequency ranges for communication in more bandwidths includes a dielectric substrate, a first subantenna, a second subantenna, a third subantenna, and first, second, and third isolators. The first to third subantennas are connected to the dielectric substrate and connect with signal sources. The first to third isolators are connected to the dielectric substrate and arranged to be between the first to third subantennas, to improve signal isolation between the subantennas. The application also provides an electronic device with the antenna having multiple frequency ranges. The antenna and the electronic device with the antenna enjoys reduced cross-interference between signals of the first subantenna, the second subantenna, and the third subantenna. The disclosure also provides an electronic device with the antenna.

17 Claims, 4 Drawing Sheets

ANTENNA WITH MULTIPLE FREQUENCY RANGES AND ELECTRONIC DEVICE

FIELD

The subject matter herein generally relates to wireless communications, in particular relates to an antenna with multi frequency ranges and an electronic device.

BACKGROUND

The Internet of Things requires advanced functionality in electronic devices. Traditional electronic devices are mostly connected to playback devices by HDMI lines. Many electronic devices have built-in playback systems and content available, which can directly play more diversified and richer media channels through wireless networks. High transmission rates are also demanded, thus antennas with larger wireless bandwidth are necessary. In order to obtain large wireless bandwidth, multiple antennas are generally set in electronic device. However, all the necessary display components of the electronic device necessitate narrow frames and thinness in depth, which restricts the sizes of antenna modules, and make the multiple antennas closer to each other. When the working frequencies of these multiple antennas are the same or similar, cross-interference is very likely, and the communication quality of the electronic device is thus reduced.

BRIEF DESCRIPTION OF THE DRAWINGS

Implementations of the present technology will now be described, by way of embodiments with reference to the attached figures.

DETAILED DESCRIPTION

Figure 1:
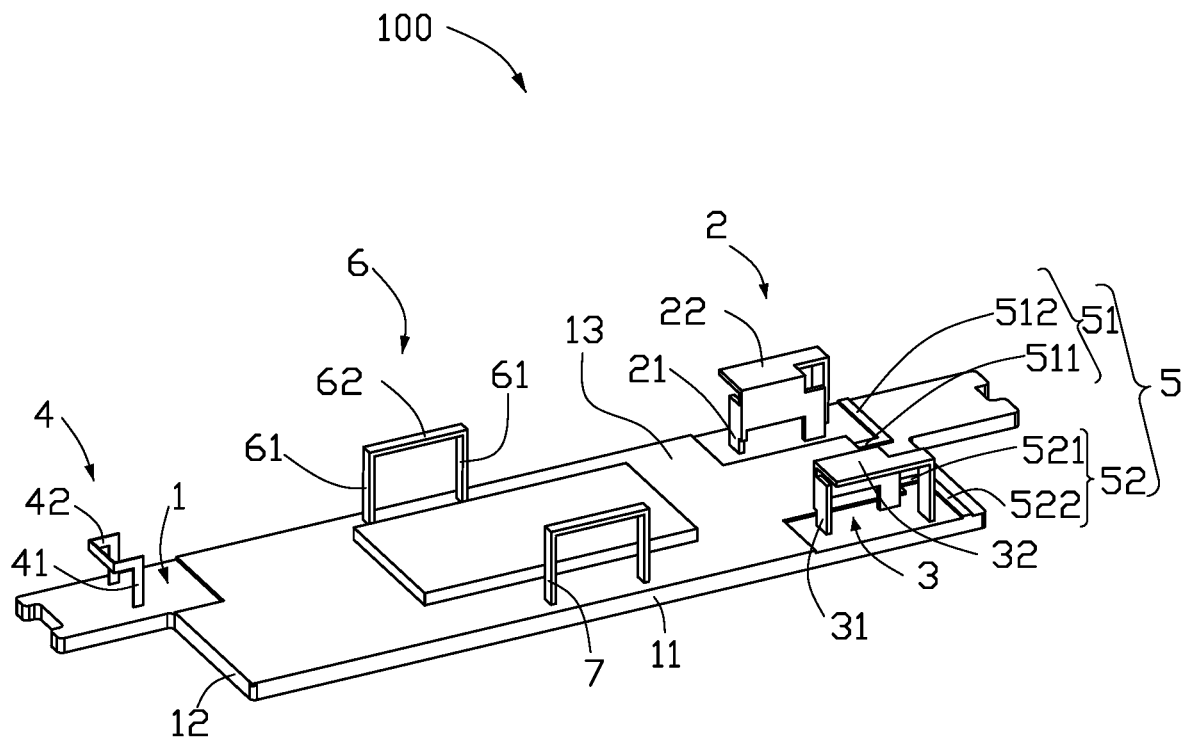
FIG. 1 is a structural diagram of an antenna with multiple frequency ranges according to an embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better show details and features of the present disclosure. The disclosure is by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. References to "a plurality of" and "a number of" mean "at least two".

Figure 2:
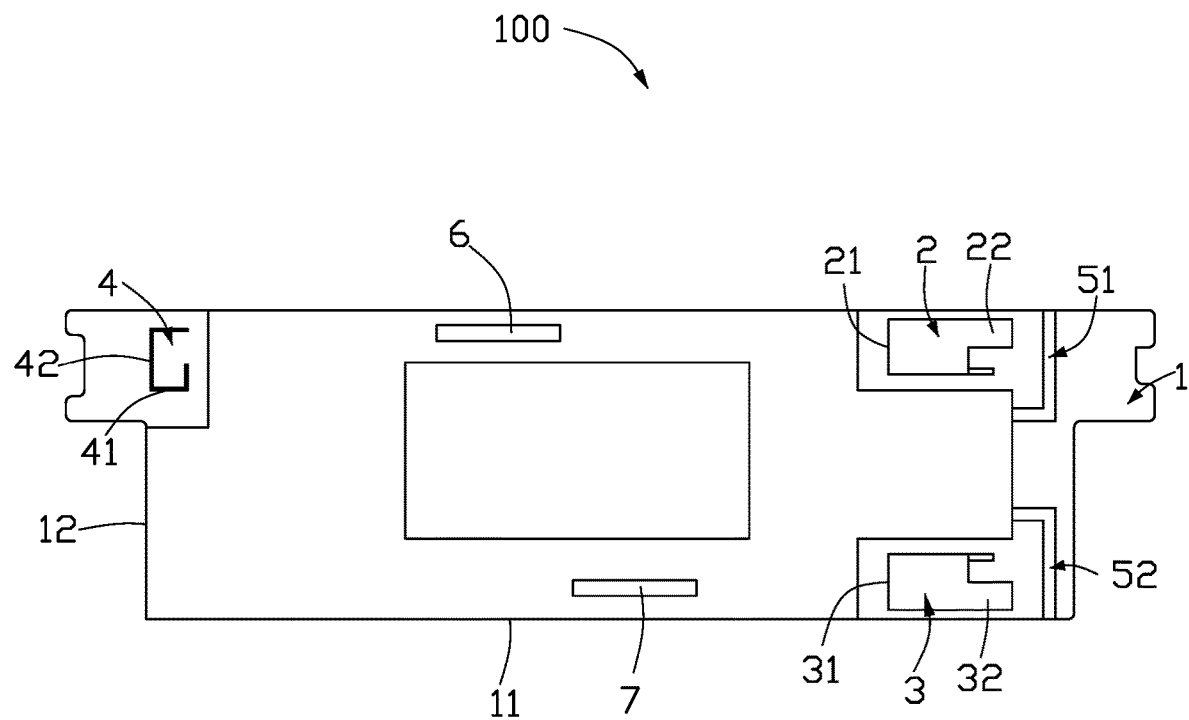
FIG. 2 is a top view of the antenna in FIG. 1.

Referring to FIGS. 1 and 2, the present application provides an antenna with multiple frequency ranges (antenna 100). The antenna 100 is arranged in an electronic device, for the electronic device to send and receive signals of multiple frequency ranges. The electronic device can be a portable computer, a mobile phone, a multimedia player, and other portable electronic device.

The antenna 100 includes a dielectric substrate 1, a first subantenna 2, a second subantenna 3, a third subantenna 4, a first isolator 5, a second isolator 6, and a third isolator 7. The first subantenna 2, the second subantenna 3, and the third subantenna 4 are connected to the dielectric substrate 1 and are electrically connected to signal sources, such as the RF module. The first isolator the second isolator 6, and the third isolator 7 are connected to the dielectric substrate 1 and are respectively arranged between on the first subantenna 2, the second subantenna 3 and the third subantenna 4 to improve isolation between the first subantenna 2, the second subantenna 3, and the third subantenna 4. In one embodiment, the working frequency of the first subantenna 2 is 2G (2.4~2.5 GHz), the working frequency of the second subantenna 3 is 5G (5.15~5.85 GHz), and the working frequency of the third subantenna 4 is 6G (6.1~6.8 GHz).

In some embodiments, the dielectric substrate 1 includes two opposite first sides 11 and two opposite second sides 12 connected between the two first sides 11. The first subantenna 2 and the second subantenna 3 are arranged close to the two first sides 11 and opposite to each other, and the third subantenna 4 is arranged adjacent to one of the second sides 12. The first isolator 5 is arranged on the second side 12 of the dielectric substrate 1 away from the third subantenna 4. The second isolator 6 and the third isolator 7 are adjacent to the two first sides 11, and are between the first subantenna 2 and the third subantenna 4, the second subantenna 3, and the second subantenna 3. The dielectric substrate 1 is an FR4 (Flame Retardant4) printed circuit board. The dielectric substrate 1 is provided with a grounded metal surface 13, the grounded metal surface 13 can be a copper-laid area on the FR4 printed circuit board. The dielectric substrate 1 includes a first signal feed line, a second signal feed line, and a third signal feed line for electrical connection with the signal sources. The first signal feed line, the second signal feed line, and the third signal feed line are electrically connected with the first subantenna 2, the second subantenna 3 and the third subantenna 4 respectively.

The first subantenna 2 includes a first feeding part 21 and a first radiating part 22. The first feeding part 21 is electrically connected to the first signal feeding line, and the first radiating part 22 is connected with one end of the first feeding part 21. The first subantenna 2 is a planar inverted-F antenna (PIFA), the first subantenna 2 is made of metal material. The first radiating part 22 can be an iron sheet or a copper foil sheet, the first radiating part 22 is vertically connected with the first feeding part 21 and extends away from the second subantenna 3, and the first feeding part 21 is perpendicular to the dielectric substrate 1.

The second subantenna 3 includes a second feeding part 31 and a second radiating part 32. The second feeding part 31 is electrically connected to the second signal feeding line, and the second radiating part 32 is connected with one end of the second feeding part 31. The second subantenna 3 is a PIFA antenna, the second subantenna 3 is made of metal material. The second radiating part 32 can be an iron sheet or a copper foil sheet, the second radiating part 32 is vertically connected with the second feeding part 31 and extends away from the second subantenna 3, and the second feeding part 31 is perpendicular to the dielectric substrate 1.

The first isolator 5 includes a first isolating part 51 and a second isolating part 52 connected to the grounding metal surface 13. The first isolating part 51 includes a first longitudinal isolation part 511 and a first transverse isolation part 512. The first longitudinal isolation part 511 extends vertically from a side of the grounding metal surface 13 away from the third subantenna 4 to a side of the grounding metal surface 13 away from the third subantenna 4, and the first transverse isolation part 512 extends vertically from the first longitudinal isolation part 511 away from the second subantenna 3. The second isolation part 52 includes a second longitudinal isolation part 521 and a second transverse isolation part 522. The second longitudinal isolation part 521 extends vertically from the side of the grounding metal surface 13 away from the third subantenna 4 to the side of the grounding metal surface 13 away from the third subantenna 4, and the second transverse isolation part 522 extends vertically from the second longitudinal isolation part 521 away from the first subantenna 2.

The third subantenna 4 includes a third feeding part 41 and a third radiating part 42. The third feeding part 41 is electrically connected to the third signal feeding line, and the third radiating part 42 is connected with one end of the third feeding part 41. The third subantenna 4 is a PIFA antenna, the third subantenna 4 is made of metal material. The third radiating part 42 may be an iron sheet or a copper foil sheet, the third radiating part 42 is vertically connected with the third feeding part 41 and extends toward the dielectric substrate 1, and the third feeding part 41 is perpendicular to the dielectric substrate 1.

The second isolator 6 includes two vertical isolation parts 61 arranged at intervals on the grounding metal surface 13 and a horizontal isolation part 62 connected between the two vertical isolation parts 61. A structure of the third isolator 7 is similar to that of the second isolator 6.

Figure 3:
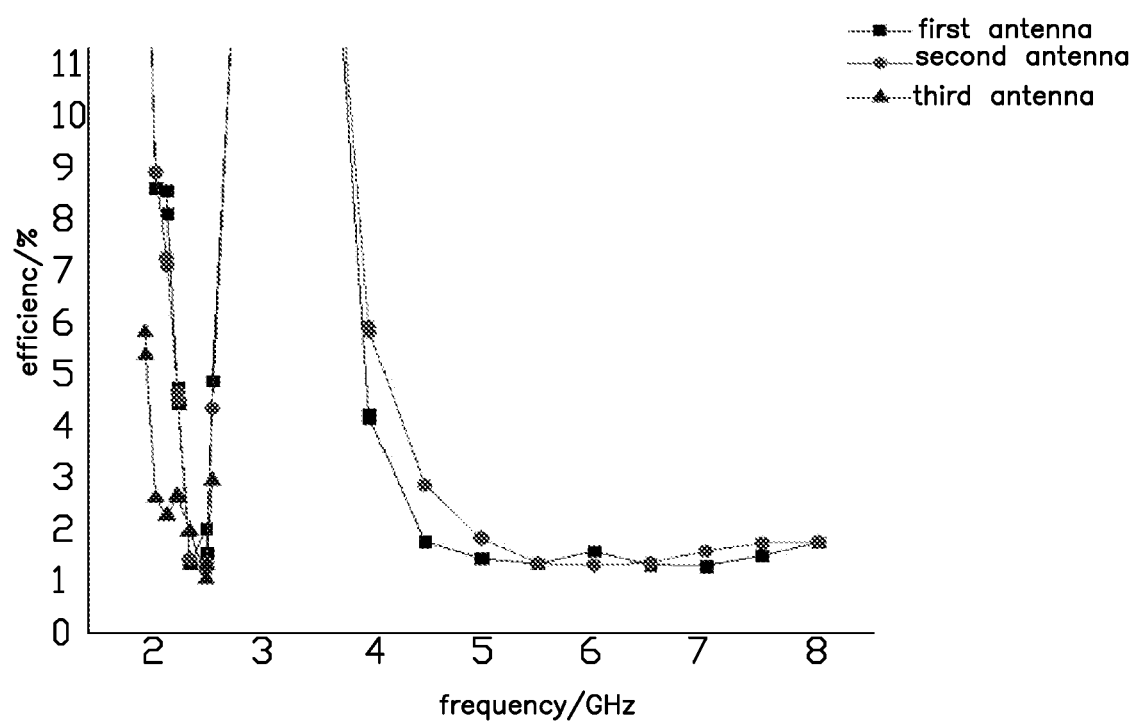
FIG. 3 shows voltage standing wave ratios of the antenna in FIG. 1.
Figure 4:
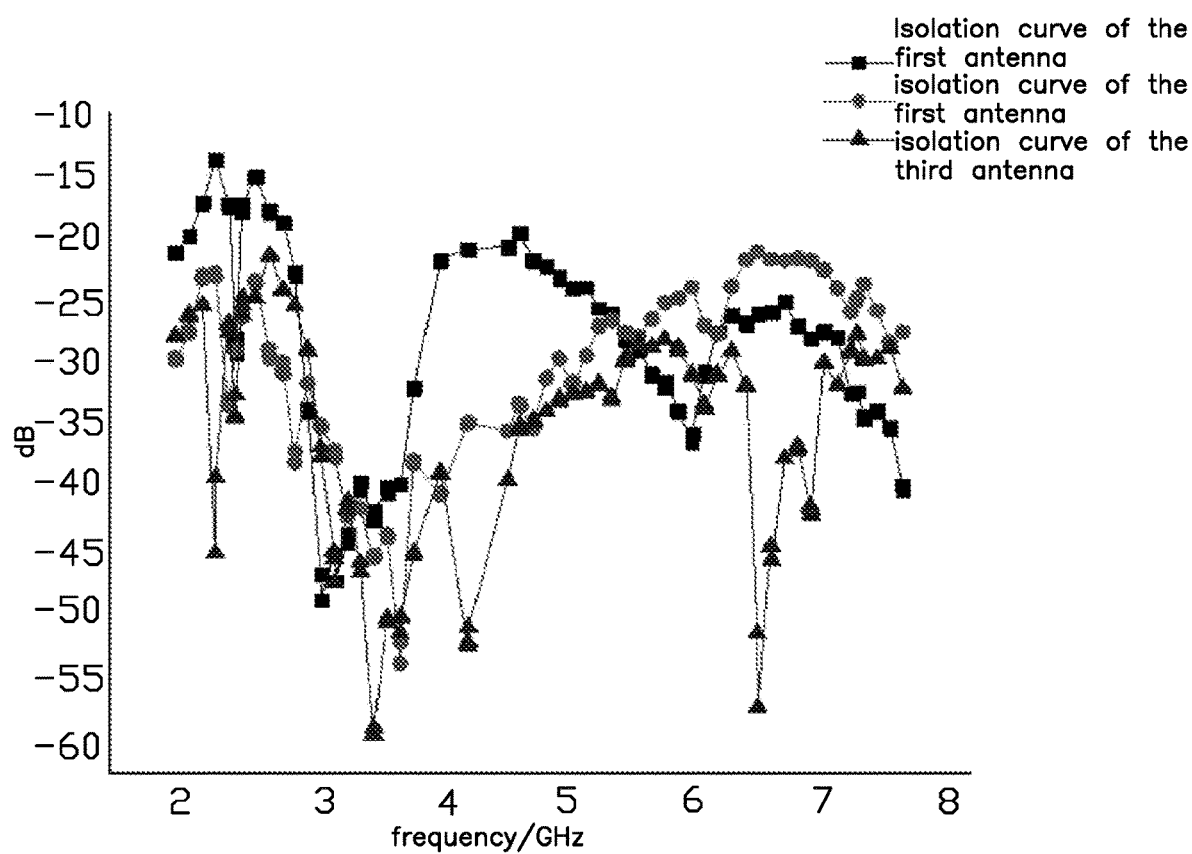
FIG. 4 is isolation curves of the antenna in FIG. 1.

The application also provides an electronic device. The multiple frequency ranges antenna 100 is arranged in the electronic device for wireless communication with other devices. The electronic device can be a portable computer, a mobile phone, a multimedia player, and other portable electronic devices. The voltage standing wave ratios of the multiple frequency ranges antenna 100 is shown in FIG. 3, and the isolation curve of the multiple frequency ranges antenna 100 is shown in FIG. 4.

The first isolator 5, the second isolator 6, and the third isolator 7 are respectively arranged between the first subantenna 2, the second subantenna 3, and the second subantenna 3 of the multiple frequency ranges antenna 100 and current paths between the antennas 2, 3, and 4 can be changed.

Thus, the electronic device can has a large wireless bandwidth for communication, and cross-interference between the antennas 2, 3, and 4 can be reduced, so as to improve the communication quality of the electronic device.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An antenna with multi frequency ranges comprising:
    a dielectric substrate;
    a first subantenna, a second subantenna, a third subantenna; and
    a first isolator, a second isolator and a third isolator;
    wherein the first subantenna, the second subantenna and the third subantenna are connected to the dielectric substrate and configured to communicate with signal sources; the first isolator, the second isolator and the third isolator are connected to the dielectric substrate and are respectively arranged between the first subantenna, the second subantenna and the third subantenna;
    wherein the dielectric substrate comprises a first signal feeding line for electrical connection with the signal sources, the first signal feeding line is electrically connected with the first subantenna;
    wherein the first subantenna comprises a first feeding part and a first radiating part, the first feeding part is electrically connected to the first signal feeding line, and the first radiating part is connected with one end of the first feeding part, the first radiating part is vertically connected with the first feeding part and extends away from the second subantenna, and the first feeding part is perpendicular to the dielectric substrate.

2. The antenna with multi frequency ranges of claim 1, wherein a working frequency of the first subantenna is 2.4~2.5 GHz, a working frequency of the second subantenna is 5.15~5.85 GHz, and the working frequency of the third subantenna is 6.1~6.8 GHz.

3. The antenna with multi frequency ranges of claim 1, wherein the dielectric substrate comprises two opposite first sides and two opposite second sides connected between the two first sides, the first subantenna and the second subantenna are respectively arranged close to the two first sides and opposite, and the third subantenna is arranged adjacent to one of the second sides, the first isolator is arranged on the second side of the dielectric substrate away from the third subantenna, the second isolator and the third isolator are respectively arranged adjacent to the two first sides, and are respectively located between the first subantenna and the third subantenna, the second subantenna and the second subantenna.

4. The antenna with multi frequency ranges of claim 1, wherein the dielectric substrate is provided with a grounding metal surface, the dielectric substrate further comprises a second signal feeding line and a third signal feeding line for electrical connection with the signal sources, the second signal feeding line and the third signal feeding line are electrically connected with the second subantenna and the third subantenna respectively.

5. The antenna with multi frequency ranges of claim 4, wherein the dielectric substrate is a FR4 printed circuit board, the grounding metal surface is a copper-laid area on the FR4 printed circuit board.

6. The antenna with multi frequency ranges of claim 4, wherein the first isolator comprises a first isolating part and a second isolating part connected to the grounding metal surface, the first isolating part comprises a first longitudinal isolation part and a first transverse isolation part, the first longitudinal isolation part extends vertically from a side of the grounding metal surface away from the third subantenna to a side of the grounding metal surface away from the third subantenna, and the first transverse isolation part extends vertically from the first longitudinal isolation part away from the second subantenna, the second isolation part comprises a second longitudinal isolation part and a second transverse isolation part, the second longitudinal isolation part extends vertically from the side of the grounding metal surface away from the third subantenna to the side of the grounding metal surface away from the third subantenna, and the second transverse isolation part extends vertically from the second longitudinal isolation part away from the first subantenna.

7. The antenna with multi frequency ranges of claim 4, wherein the second isolator comprises two vertical isolation parts arranged at intervals on the grounding metal surface and a horizontal isolation part connected between the two vertical isolation parts.

8. The antenna with multi frequency ranges of claim 4, wherein the third subantenna comprises a third feeding part and a third radiating part, the third feeding part is electrically connected to the third signal feeding line, and the third radiating part is connected with one end of the third feeding part, the third radiating part is vertically connected with the third feeding part and extends toward the dielectric substrate, and the third feeding part is perpendicular to the dielectric substrate.

9. An electronic device comprising:
an antenna with multi frequency ranges, comprising:
a dielectric substrate;
a first subantenna, a second subantenna, a third subantenna; and
a first isolator, a second isolator and a third isolator;
wherein the first subantenna, the second subantenna and the third subantenna are connected to the dielectric substrate and configured to communicate with signal sources; the first isolator, the second isolator and the third isolator are connected to the dielectric substrate and are respectively arranged between the first subantenna, the second subantenna and the third subantenna;
wherein the dielectric substrate comprises a first signal feeding line for electrical connection with the signal sources, the first signal feeding line is electrically connected with the first subantenna;
wherein the first subantenna comprises a first feeding part and a first radiating part, the first feeding part is electrically connected to the first signal feeding line, and the first radiating part is connected with one end of the first feeding part, the first radiating part is vertically connected with the first feeding part and extends away from the second subantenna, and the first feeding part is perpendicular to the dielectric substrate.

10. The electronic device of claim 9, wherein a working frequency of the first subantenna is 2.4~2.5 GHz, a working frequency of the second subantenna is 5.15~5.85 GHz, and the working frequency of the third subantenna is 6.1~6.8 GHz.

11. The electronic device of claim 9, wherein the dielectric substrate comprises two opposite first sides and two opposite second sides connected between the two first sides, the first subantenna and the second subantenna are respectively arranged close to the two first sides and opposite, and the third subantenna is arranged adjacent to one of the second sides, the first isolator is arranged on the second side of the dielectric substrate away from the third subantenna, the second isolator and the third isolator are respectively arranged adjacent to the two first sides, and are respectively located between the first subantenna and the third subantenna, the second subantenna and the second subantenna.

12. The electronic device of claim 9, wherein the dielectric substrate is provided with a grounding metal surface, the dielectric substrate further comprises a second signal feeding line and a third signal feeding line for electrical connection with the signal sources, the second signal feeding line and the third signal feeding line are electrically connected with the second subantenna and the third subantenna respectively.

13. The electronic device of claim 12, wherein the dielectric substrate is a FR4 printed circuit board, the grounding metal surface is a copper-laid area on the FR4 printed circuit board.

14. The electronic device of claim 12, wherein the first isolator comprises a first isolating part and a second isolating part connected to the grounding metal surface, the first isolating part comprises a first longitudinal isolation part and a first transverse isolation part, the first longitudinal isolation part extends vertically from a side of the grounding metal surface away from the third subantenna to a side of the grounding metal surface away from the third subantenna, and the first transverse isolation part extends vertically from the first longitudinal isolation part away from the second subantenna, the second isolation part comprises a second longitudinal isolation part and a second transverse isolation part, the second longitudinal isolation part extends vertically from the side of the grounding metal surface away from the third subantenna to the side of the grounding metal surface away from the third subantenna, and the second transverse isolation part extends vertically from the second longitudinal isolation part away from the first subantenna.

15. The electronic device of claim 12, wherein the second isolator comprises two vertical isolation parts arranged at intervals on the grounding metal surface and a horizontal isolation part connected between the two vertical isolation parts.

16. The electronic device of claim 12, wherein the third subantenna comprises a third feeding part and a third radiating part, the third feeding part is electrically connected to the third signal feeding line, and the third radiating part is connected with one end of the third feeding part, the third radiating part is vertically connected with the third feeding part and extends toward the dielectric substrate, and the third feeding part is perpendicular to the dielectric substrate.

17. An antenna with multi frequency ranges comprising:
a dielectric substrate;
a first subantenna, a second subantenna, a third subantenna; and
a first isolator, a second isolator and a third isolator;
wherein the first subantenna, the second subantenna and the third subantenna are connected to the dielectric substrate and configured to communicate with signal sources; the first isolator, the second isolator and the third isolator are connected to the dielectric substrate and are respectively arranged between the first subantenna, the second subantenna and the third subantenna;
wherein the dielectric substrate is provided with a grounding metal surface, the second isolator comprises two vertical isolation parts arranged at intervals on the grounding metal surface and a horizontal isolation part connected between the two vertical isolation parts.

* * * * *